WILLIAM H. GRAY.

Improvement in Lamp Burners.

No. 4,435. Reissued June 20, 1871.

Witnesses.
A. Ruppert.
R. H. Henderson

W. H. Gray
Inventor.
D. P. Holloway & Co
Attys

AM. PHOTO-LITHOGRAPHIC CO. N.Y. (OSBORNE'S PROCESS.)

UNITED STATES PATENT OFFICE.

WILLIAM H. GRAY, OF ST. LOUIS, MISSOURI, ASSIGNOR OF PART INTEREST TO SAMUEL ROSS.

IMPROVEMENT IN LAMP-BURNERS.

Specification forming part of Letters Patent No. 113,876, dated April 18, 1871; reissue No. 4,435, dated June 20, 1871.

*To all whom it may concern:*

Be it known that I, WILLIAM H. GRAY, of the city and county of St. Louis and State of Missouri, have invented a certain Improvement in Lamp-Burners; and I do hereby declare that the following is a full, clear, and exact description thereof, reference being had to the annexed drawing making a part of this specification, in which—

Figure 1:
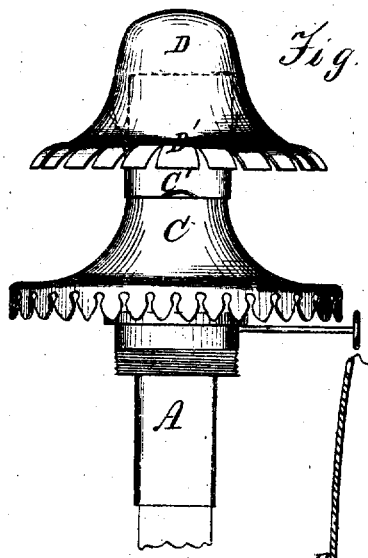
Figure 2:
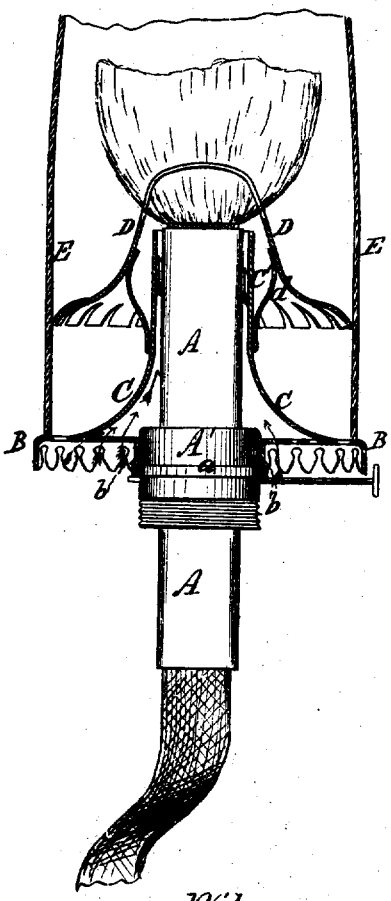
Figure 3:
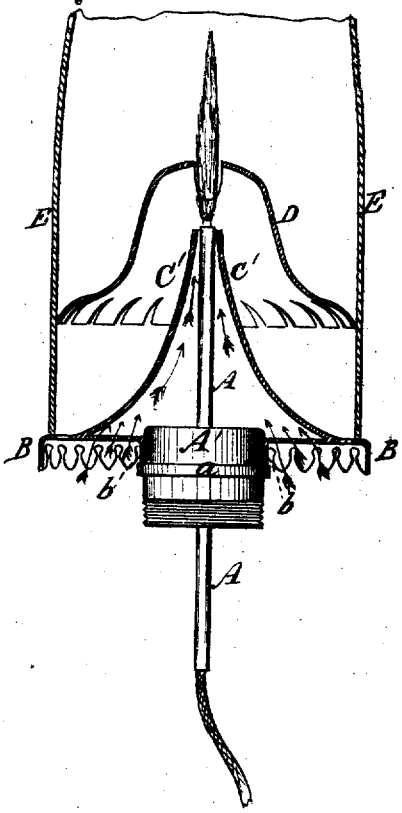

Figure I is an elevation of the burner. Fig. II is a vertical section in a plane parallel to the flat side of the wick-tube. Fig. III is a vertical section in a plane at right angles to the one shown in Fig. 2.

The same letters of reference are employed in all the figures in the designation of identical parts.

This invention relates to lamp-burners of that class in which the wick-tube is extended down into the lamp-bowl to reach to near the bottom thereof; and the improvement consists in combining with such wick-tube a dome or tube encircling it, the contracted end of which reaches to the top of the wick-tube, so as to form a narrow air-space around the latter, through which the upward currents of cold air, entering through the foraminous base of the dome, pass to the flame, and, impinging against the wick-tube, keeps it at such low temperature that all danger of setting fire to the contents of the fountain or bowl, by the overheating of the wick-tube, is removed.

To enable those skilled in the art to make and use my invention, I will proceed to describe its construction and operation.

The wick-tube A is extended below the hollow plug or cap A′, by which it is screwed into the neck of a lamp-bowl to reach to near the bottom of such bowl. The chimney-supporting base B is a circular or otherwise properly-formed piece of metal, with a large central aperture fitting the hollow cap on a collar, *a*, on which it rests, with a short downwardly-projecting annular flange, *b*, which is formed on its under side around the aperture. That portion of this base which is covered by the lower dome C is finely perforated or slotted, and around the edge of the dome are larger slots or perforations, to be covered by the chimney E. The dome C is gradually contracted from its junction with the chimney-base, to which it is soldered or riveted, presenting an unbroken concave outer surface until its sides come nearly in contact with the wick-tube; thence its sides are carried up parallel or nearly parallel to the latter, forming an elongated neck or tube, C′, which terminates at or near the upper end of the wick-tube, and forms a narrow air-passage, *c*, around the same. The currents of cold air entering through the perforations of the base B, under the dome, are thus caused to impinge against the wick-tube, and kept in contact therewith until they issue at the top, in consequence of which the wick-tube will be maintained at such low temperature that its lower end may safely be immersed in the fluid in the bowl. The upper dome or deflector D, which has the usual flame-aperture above the wick-tube, is formed with the well-known slitted flange D′ to serve as a chimney-holder, and is rigidly secured to the lower cone by arms or posts *d d*.

What I claim as my invention, and desire to secure by Letters Patent, is—

In combination with the wick-tube A, which is extended below the cap A′ so as to reach down into the fluid in the lamp-bowl, the dome C, when constructed with an elongated neck, C′, to form an air-passage around and to or nearly to the top of the wick-tube, substantially as and for the purpose set forth.

In testimony whereof I have signed my name to the foregoing specification in the presence of two subscribing witnesses.

WILLIAM H. GRAY.

Witnesses:

C. F. CLAUSEN,

A. RUPPERT.